US007149679B2

(12) United States Patent
Woodring

(10) Patent No.: US 7,149,679 B2
(45) Date of Patent: Dec. 12, 2006

(54) COMPLEX PROCESS MODELING AND SIMULATION SYSTEM AND METHOD

(75) Inventor: John Woodring, Jacksonville, FL (US)

(73) Assignee: Expand, Inc., Orlando, FL (US)

( * ) Notice: Subject to any disclaimer, the term of this patent is extended or adjusted under 35 U.S.C. 154(b) by 536 days.

(21) Appl. No.: 10/733,367

(22) Filed: Dec. 12, 2003

(65) Prior Publication Data

US 2005/0131667 A1 Jun. 16, 2005

(51) Int. Cl.
*G06F 9/45* (2006.01)
(52) U.S. Cl. .......................................... 703/22; 716/11
(58) Field of Classification Search .................. 703/22, 703/2, 1; 715/771, 970; 707/101; 716/11; 704/9
See application file for complete search history.

(56) References Cited

U.S. PATENT DOCUMENTS

| 5,233,513 A | * | 8/1993 | Doyle ........................... 705/7 |
| 6,002,396 A | * | 12/1999 | Davies ....................... 715/763 |
| 6,233,537 B1 | * | 5/2001 | Gryphon et al. ................ 703/1 |
| 6,415,196 B1 | * | 7/2002 | Crampton et al. .......... 700/100 |
| 7,047,557 B1 | * | 5/2006 | Enomoto ........................ 726/1 |
| 7,055,109 B1 | * | 5/2006 | Boden et al. ................ 715/854 |
| 7,058,643 B1 | * | 6/2006 | Vailaya ........................ 707/101 |

FOREIGN PATENT DOCUMENTS

WO      WO 00/65488       11/2000

\* cited by examiner

*Primary Examiner*—Albert W. Paladini
(74) *Attorney, Agent, or Firm*—Arnold & Porter LLP

(57) ABSTRACT

A method and apparatus for creating a complex process model for use in a graphical environment, with the process utilizing defined entities including places, transitions, and arcs. Places represent data types, transitions represent actions, and arcs represent the connection of places and transitions. The places, transitions, and arcs may be interchanged by the user without the need to recreate the entire model. The invention also includes a method and apparatus of simulating a complex process, by identifying the attributes and values of the places and transitions, identifying the parameters of the connecting arcs, and manipulating the places, transitions, and arcs to constitute a process in action.

27 Claims, 10 Drawing Sheets

FIGURE 7

- Air Response
  - Enemy planes : Identify enemy on AWACS radar
  - Identify enemy on AWACS radar : AWACS
  - AWACS : Share target information over battle network
  - Share target information over battle network : F-15
  - F-15 : Attack enemy from F-15
  - Attack enemy from F-15 : Enemy planes
- Ground Response
  - Enemy planes : Identify enemy on ground based radar
  - Identify enemy on ground based radar : Ground radar
  - Ground radar : Share target information over battle network
  - Share target information over battle network : Anti-aircraft missile
  - Anti-aircraft missile : Attack enemy from ground based missiles
  - Attack enemy from ground based missiles : Enemy planes

COMPLEX PROCESS MODELING AND SIMULATION SYSTEM AND METHOD

COMPUTER PROGRAM LISTING APPENDIX

This application includes a computer program listing appendix on DISC 1 containing the files listed in APPENDIX A attached hereto.

FIELD OF THE INVENTION

This invention relates to the field of complex process design and simulation. In particular, this invention relates to a system and method for graphically representing a model architecture in a way that allows it to be directly executed within a design tool. This methodology allows for a more accurate and robust estimate of a system's dynamic properties and subsequently assists in evaluating new systems and introducing them into the marketplace with decreased initial investment, time and risk. This invention also relates to the simulation of the graphically modeled system in a new and robust manner.

The present invention can be applied to communications networks, business workflows, military tactics, and distributed processing, among other systems. The present invention reduces the time and expense involved in traditional methods of system design selection and evaluation, and allows for dynamic "on the fly" changes that permit real-time simulation and evaluation.

DESCRIPTION AND HISTORY OF PRIOR ART

Before to the present invention, analysts attempted to predict the performance and characteristics of prototypes using techniques invented by mathematicians and inherited by computer software engineers. As such, modeling and simulation was viewed as an arcane art practiced only by a few specialists who generally had little detailed knowledge about the subject matter of the system. This led to many errors in understanding and subsequently models that often did not represent the detailed working of the prototype. This was, of course, a predictable result that arose from the dichotomy between the perspectives of the user group, which was application oriented, and the evaluation group, which described a concrete system as a set of abstract mathematical representations. Software tools were developed in the early 1980s to assist subject matter experts to represent conceptual systems digitally, and, by the end of the decade, Computer Aided Design (CAD) became an established technique. Likewise, simulation software became easier to develop—in part due to the introduction of more powerful, fourth-generation computer languages and improved computer interfaces. Still, the bridge between prototype design and prototype evaluation was not formed, and the two disciplines remained distinct and separate.

During the 1990s, software tools were developed to further assist analysts in representing and understanding the behavior of complex systems. These tools were generally referred to as CASE (Computer Aided Software Engineering) tools, and, on the whole, their impact in terms of creating more robust simulation software was significant. In parallel, much work was performed in the area of system representation—an attempt to form a compact "language" that could be used to describe complex systems that was, at the same time, machine interpretable. Such languages attempted to avoid the inherent ambiguity associated with natural language by using a specialized lexicon with non-ambiguous meaning and semantics that could be applied to all conceptual system designs. Thus, the state-of-the-art was pushed forward in both system design and system evaluation, but little progress was made in integrating the two techniques except in a few highly specialized areas.

Examples of the prior art include a product developed by Rational Software Corporation. Rational Rose is a tool kit that simplifies software design and evaluation by using the UML (Unified Modeling Language) to represent complex systems and Object Oriented software to evaluate them. Thus, Rational Rose is merely a tool used to assist the user in developing Object Oriented software in the design, code generation, code testing, Requirements Analysis and life-cycle maintenance phases.

Another example of prior art is a product known as BONAPART Professional, a tool for simulation and analysis of business processes. Customers can also use BONAPART Collaborative, an innovative Java-based tool for Web-based Intra-/Internet collaborative work. The majority of customers, both in Europe and abroad, use BONAPART in the documentation and optimization of processes and organizational structures. Companies of all sizes use BONAPART to structure their business, measure process efficiency with regard to critical success factors, and simulate process alternatives before deciding on the optimal process for implementation. As a result, business processes are modified to be more efficient and to better meet customer expectations.

Another prior art program is Popkin System Architect, a comprehensive and powerful modeling solution designed to provide all of the tools necessary for development of successful enterprise systems. It is the only tool to integrate, in one multi-user product, industry-leading support for all major areas of modeling, including business process modeling, object-oriented and component modeling with UML, relational data modeling, and structured analysis and design. All functionality is harnessed within System Architect's extensible repository with native support for Microsoft VBA.

Another example of the prior art is Design CPN—a non-commercial Colored Petri Net design and execution tool created and distributed by the University of Aarhus (Denmark)

Another example of the prior art is AllFusion ERwin Data Modeler is an industry-leading data modeling solution that can help you create and maintain databases, data warehouses and enterprise data models. AllFusion ERwin data models help you visualize data structures to facilitate the organization, management and moderation of data complexities, database technologies and the deployment environment. Databases can be developed more quickly while dramatically improving quality and maintainability.

Another example of the prior art is MITRE MRT—three separate tools used for the design, specification and execution of model architectures.

All of the prior art suffer from defects which are overcome by the present invention. In general, in the prior art one creates a prototype design (often referred to as a model architecture) using some representational language. In the best case, the language is graphical based, has a lexicon that is unambiguous and semantics that are descriptively rich and can be understood by machines. In the worst case, the language does not have these features.

The prototype design is then given to computer software engineers who "interpret" the design and convert it into a computer model, which then becomes a "model of a model". There are many possibilities for errors, unwarranted approximations, misinterpretations and misunderstandings. Through iterative "negotiations" between those who are stakeholders in the design and those who are stakeholders in the computer simulation model, a final product that approximates the prototype concept is produced in one tool.

In almost all cases, the results of quantitative evaluation through simulation lead to unanswered questions, the most common of which is how the prototype can be modified to produce better results. In fact, a set of prototype variants is usually proposed to optimize performance or meet some identified performance goals. Each variant must be designed and converted into a computer model by a pair of separate events that are time consuming, expensive and inefficient. There is no certainty that all of the computer models representing the prototype variants have the same fidelity, resolution and scope.

After variations of the prototype have been exhaustively analyzed, a candidate design is chosen. However, there is little confidence that the optimal design has been selected, and the rush of time generally dictates the end of the process, with many questions still unanswered.

The present invention overcomes these deficiencies by creating a design using a representational language that is powerful, universally accepted, easy to learn and easy to use. The resulting design is machine understandable.

Computer software engineers build libraries of functions to support the execution of the prototype, but no interpretation of the design is required. The functions can be directly used by the prototype designers and linked into the design by them. This ensures that the intentions of the designers are not distorted by the software developers.

Analysts can re-configure the architecture design and the corresponding simulation model will automatically adjust to the changes made to it. The analyst can even change a design while it is executing, making a seamless transition between two variants of the prototype. Analysis of alternatives is quick, efficient and consistent.

Since conceptual designs are created and evaluated by subject matter experts with only minimal intrusion by software engineers, there is a high level of confidence that the optimal design has been identified. The process is rapid, accurate and all variants are evaluated in the same way with the prejudices of "interpretation".

In addition, the prior art provides either very limited, or no ability to investigate the dynamic properties of a model architecture through model execution/simulation. The prior art also does not enforce fundamental rules of association in the design element of the tool so that the user is constrained to create valid models. The prior art also does not provide a direct method for modeling concurrency and thus have limited usefulness in describing real-world problems.

In addition the prior art is unable to integrate a design with other software elements executing remotely in a distributed-processing environment. The prior art has only limited support for specifying mathematical functions and logic in high-level computer languages. This restricts their usefulness in evaluating model architectures. The prior art does not provide a capability for building a hierarchical model and automatically updating higher-level constructs directly when their embedded components are changed. The prior art does not support the use of a relational database repository for storing pre-build entities and extended entities created for the base entities. The prior art does not allow graphical elements (pictures, icons, artwork, etc.) to be embedded in the design to enhance visualization of the model. And, the prior art does not allow discrete events to be captured during the execution of the model so that the user can replay the execution in a step-by-step manner.

SUMMARY OF THE INVENTION

The invention provides a system and method wherein to simulate complex processes. In the present invention evaluation of processes is performed dynamically. A user may employ pre-defined building blocks or "user-defined" building blocks. The present invention involves graphical modeling (i.e. modeling in a graphical environment) in a "multi-thread" manner—not constrained to one set of parameters. The present invention interoperates with other tools, and may be utilized on a computer system (either stand-alone or networked environment).

In one embodiment of the present invention, the user designs a complex system to be modeled. The design is flexible, using building blocks—either user specified or pre-defined—inherent to the project. By their nature the building blocks of a modeled system are flexible so that the system can readily incorporate many different aspects (i.e., the user is not necessarily constrained to a certain set of parameters as in the prior art). These "building block" objects may be embodied in a graphical environment for ease of use, and may be readily portable to a computer environment. Thus, unlike in the prior art, there is no need to further "model" the created model by manipulating it in a manner such that it can be implemented in a computer.

The building blocks of the design can be easily changed, allowing for different variants of the design (or even radical departures from the design) to be easily incorporated into the modeled system for alternate scenario, or variant, analysis, especially when incorporated in real time or "on the fly."

In addition, the building blocks of the present invention are such that they need not be designed into a computer environment; the user may input functions to manipulate the operation of the building blocks, and these functions can be designed in a way such that they are easily created and incorporated into the overall design scheme.

According to an embodiment of the present invention, a system is modeled by first defining the entities present in the system. These entities include "places," "place regions," "transition regions," "transitions," and "arcs." The "places" are more commonly known as the "nouns" of the present invention, and define system parameters. These nouns are usually "things" sought to be modeled in a system such as houses (if modeling a city), cars (if modeling traffic flow), or military equipment (if modeling military situations). Nouns usually contain "tokens"—individual sub-units of a noun that define, enhance, or limit the noun. For example, a "token" for a house in a modeled city could be a water line; a "token" for a car in a modeled traffic flow could be a gallon of gasoline; and a "token" for a piece of military equipment in a modeled military situation could be a 105mm cannon. In addition, a token can be created to represent smaller subsets of tokens—for example, a token "vehicle" might exist as an entity that has as its members tokens "cars," "buses," and "trucks."

The "transitions" are more commonly known as "verbs" of the present invention, and define system events. These verbs are usually the "actions" sought to be modeled in a system such as "open" and "close" in a modeled house system, "accelerate" and "decelerate" in a modeled traffic flow, or "fire" and "release" in a modeled military situation.

The links between nouns and verbs are known as "arcs." Arcs define the events that occur to nouns and their tokens based on verbs. For example, the verb "open water line"

when applied to the noun house in a modeled city would act on the token "water line" in the noun "house" with the verb "open". And, the verb "accelerate gasoline" when applied to the noun car in a modeled traffic flow would act on the token gallon of gasoline in a manner such that the gasoline would be modeled as being used when the "accelerate" verb occurs. Finally, the verb "fire 105 mm cannon" when applied to the noun military equipment in a modeled military situation would result in a round of cannon ammunition being expended. Note that two types of arcs exist: input arcs, which remove tokens from nouns; and output arcs, which receive tokens to be added to nouns.

"Place Regions" and "Transition Regions" define a larger or small subset of places and transitions. They are containers for places, transitions, and other regions. Places and transitions operate and interact via arcs; the regions themselves are not directly involved in the interaction. Place or transition regions are used to show containment or association. A group of places or transitions may be owned by, or under the control of, a larger entity, or the places or transitions within a region may share some feature that is identified by the grouping. Regions are thus larger building blocks from which a system can be modeled.

In another embodiment of the present invention, parameters of the building blocks and functions of the present invention may be interchanged in a fast yet effective manner. Merely replacing one block—a noun or verb, for example—can be done seamlessly with the values for the new block interacting within the model. The entire model does not have to be re-done when replacing a block—only that object. Thus, objects can be deleted and/or replaced; the end result (and all interim steps) is recalculated in real-time ("on the fly") based on new architecture.

As indicated, in the present invention objects are linked together. Visually, the linking is done by a graphical connection: rules are developed to describe information, and rules are developed to describe data flow. These rules are applied to two or more objects to link them together, with the results of the rules application yielding other objects (as embodied by an arc relationship). These other objects may be further operated on by other rules/links. The end result is a modeled simulation based on objects and links. In addition, the links can be deleted and/or replaced; end result is recalculated in real-time based on new architecture. As indicated, a combination of objects and links can be deleted and/or replaced with new architecture being modeled in real-time.

The design of the present invention operates in computer environment, including the Windows environment, utilizing Vbasic and C++ language. The computer system may be a personal computer system, either stand-alone or in a networked environment. An embodiment of the present invention is shown by the computer files listed in Appendix A (attached hereto and provided on DISC 1) in conjunction with a computer operating in the Microsoft Windows environment.

In the present invention the user defines all states (the building blocks), either by creating new objects or by using pre-defined objects. The object's individual status is defined, the types of actions that can be applied to the object are defined, and an indicator of when a state change of the object can occur is defined. The states are created in a graphical environment. Next, objects are linked together in a graphical environment. Linking is performed using the aforementioned noun-verb syntax. Because the system is designed to be user-friendly, graphical icons exist, and are different, for nouns and verbs.

The design of the present invention is thus described in declarative sentences of the noun-verb format. Graphical arcs show the flow of information. Data is presented in nouns (as tokens); and is operated on by verbs (representing transitions or functions). Operation on data is conditional based on values and characteristics of object. This design allows the simultaneous execution of processes (as well as independent execution). Finally, in the design of the present invention nouns and verbs may be changed; if so the resulting process changes as well.

The simulation of the present invention is a simple matter of establishing an initial place for each noun (with its tokens). This "place" can be established by any means, but is usually done by a positional reference (i.e. at geographical coordinates x, y, and z. The "place" can also be established with a temporal reference. During the execution of the simulation, pre-established functions, related to the transition verbs, and inherently linked by arcs, related to the place nouns (and tokens), describe the simulation and its snapshot at any one point. For example, the Engage Treads command might be given to a tank, with the verb (engage) operating on the noun tank; more specifically, on the tokens (treads) of the tank. By issuing this arc, a function might be associated with the command so as to allow the physical movement of the represented noun in a computer environment.

BRIEF DESCRIPTION OF FIGURES/DRAWINGS

FIG. 7 shows an example of the creation of threads using an embodiment of the present invention in a Windows computer environment.

DETAILED DESCRIPTION OF THE PREFERRED EMBODIMENT OF THE PRESENT INVENTION

Figure 1:
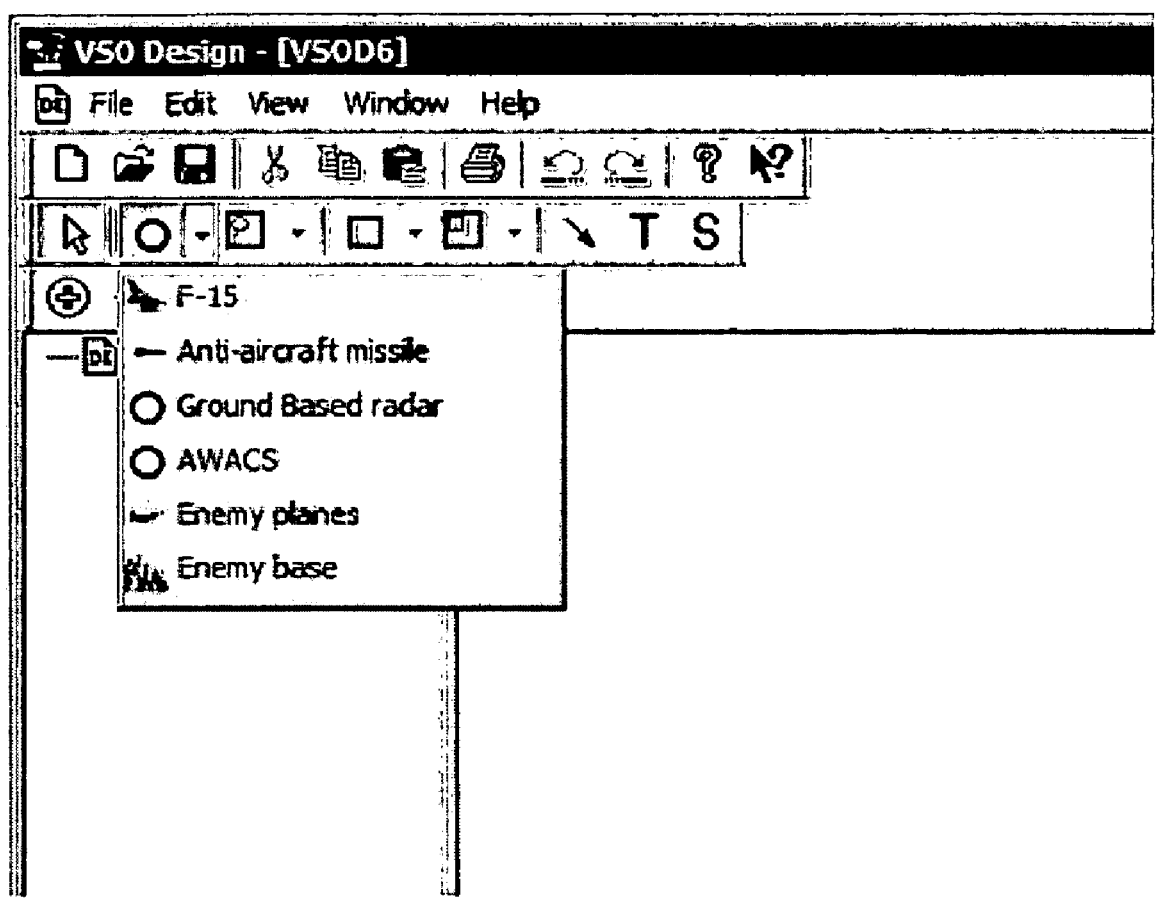
FIG. 1 shows an example of the creation of places using an embodiment of the present invention in a Windows computer environment.

For the design of the present invention, the preferred embodiment uses Hierarchical Colored Petri Nets (HCPNs). HCPNs model a system or process. HCPNs can be an entire system or a sub-system; a sub-system can be used with other HCPNs systems. HCPNs define all possible states for a system, and can be represented graphically. Hierarchical Colored Petri Nets model systems by explicitly defining all the possible states for a system and the actions that govern the changing of those states. At a base level, a system's possible states and actions provide a static snapshot of the system. This snapshot is in the form of the graphical representation of the system. Graphically representing a system design, however, is not the only goal or possibility with HCPNs. System simulation is also a primary goal of system modeling and a key aspect to collaborative virtual prototyping. System simulation allows for the validation of a system's design and an evaluation of a system's performance. If the graphical representation of a system design is a snapshot of the system, the simulation is a movie.

The present invention represents a modeling and simulation method and system utilizing places, tokens, and transitions within the noun-verb syntax described above. In the present invention, nouns represent places where information resides. For example, if an Air Defense system is being modeled in the present invention, a noun represents a "place" such as an anti-aircraft battery. Nouns contain information, and this information dictates system actions and/or performance. The information is represented by tokens; each noun contains a user-defined or system-defined number of tokens. Tokens are defined by data types (e.g. text, integer, date, numerical value). For example: A fighter aircraft might have tokens for anti-air missiles, air-ground missiles, and cannon rounds as data types (three separate tokens). Another token could represent the data type "armaments", and be defined by the union of the three separate weapons data types. The definition of this data type can be arbitrarily complex, ranging from the simple data type of an integer to an arbitrarily complex data type of other simple data types. The value of the tokens contained in the place will always be within the set defined by the data type.

The states a system may reside in are represented by a collection of places in a HCPN. Individually, the places of a HCPN do not describe the state of the system as a whole but collectively all the places as well as the tokens they contain (the places marking) describe the state of a system.

In a graphical representation of the present invention places are represented by circles and ellipses, with name and data type inside.

Each place contains a number of tokens with a value of the data type for the place. For example, consider the place F-15 from the air defense system having a data type of armaments. The armaments data type is defined as the union of Sparrow missiles, Sidewinder missiles, and 20 mm rounds. The F-15 might contain 4 tokens of Sparrow missiles, 4 tokens of Sidewinder missiles, and 940 tokens of 20 mm rounds. Initially the place would have all the tokens; however, as threats are identified to the military base and the F-15 is dispatched to eliminate these threats, the F-15s would expend these tokens. The tokens that the place contains at any given time are its marking. Aggregated together all of the individual markings of places on the HCPN at a given time comprise the marking of the HCPN and thus its state.

The marking of the place when the system is first begun is called the initial marking. This marking is the only marking defined by the designer of the system. All other markings follow as a result of the Transitions of the systems changing the state of the system.

In order to develop a complete view of how a modeled and simulated system operates, there must be a mechanism by which the system can move from one state to another as time progresses. Actions in HCPNs of the present invention are represented by Transitions and Arcs. Transitions are the verbs of a system and represent the actions of a HCPN. They represent the method by which the marking of a place can be changed. Transitions change the marking of places they are connected to by removing tokens from places and adding them to other places.

Verbs connected to nouns to operate on the data tokens contained in the nouns (for example, the verb Fire Missile could be applied to a cannon round data token (noun)) The simulation is updated based on operation of verb on selected nouns (that is, the data token in the example above would be reduced by a set number of cannon rounds after the Fire Missile verb).

The rules under which Transitions fire are based upon the construct, which connects those Transitions to their places. That construct is called the arc (described herein).

Graphically Transitions are represented as rectangles. The name of the Transition lies inside of the rectangle.

Arcs define rules upon which verbs (transitions) operate on nouns (data). There are two types of arcs—input and output arcs. Input arcs remove tokens from nouns in which they are connected) and allow them to be operated on by verbs. Arcs will "evaluate" the token if it is compatible (i.e. the value can bind to a variable in the arc expression). All variables of arc must match up to data variable for token "evaluation". Arcs may also have an expression in the form of a Boolean expression that, upon application of verbs, will result in a Boolean result (e.g., TRUE).

Output arcs receive tokens on the basis of verb operations and are added to nouns. Output arcs follow same "evaluation" rules for input arcs.

As an example, consider the following, showing how input arcs govern the rules and specifics of token transfer. The Verb might be "Fire Sparrow Missile", with the Noun as an F-15 airplane. Tokens in Noun F-15 might have the value of data type Sparrow Missile, Sidewinder Missile, and Cannon. An Input Arc of the Fire Sparrow Missile verb connects to F-15 noun. The variable in the arc is "Sparrow Missile," upon operation the token having the value "Sparrow Missile" (NOT the Sidewinder Missile or Cannon tokens) "evaluates" to the arc. A guard expression with a Boolean TRUE analysis could also be utilized—the Verb could have a guard expression of "armed;" only those noun/tokens that matched this guard (i.e., only those Sparrow Missiles that were armed in the F-15 noun) would be operated on. Also, Output Arcs also govern the rules and specifics of token transfer. In this example, as a result of a Fire Sparrow Missile application to an arc with data type "undestroyed threat", one of the tokens in "undestroyed threat" would be destroyed and the total data value would be modified.

As another example, suppose the "Fire a Sparrow Missile" Transition had another input arc, this one connected to the place Enemy Threats (the Transition now has both an input arc and an output arc connected to Enemy Threats), and that this new input arc has an arc expression of the variable threat, which is defined with the data type "undestroyed threat". This input arc would only evaluate to a token if there is a token on the place Enemy Threats with the value "undestroyed threat". The Transition "Fire a Sparrow Missile would only fire then if both input Arcs evaluate to tokens. If there is an undestroyed threat and the F-15 has a missile, the Transition "Fire a Sparrow Missile" would fire and destroy the threat. This movement of tokens amongst places by the firing of Transitions is collectively called the token game.

A system may be modeled by building design entities. Basically, as one step of building a HCPN system, the present invention defines basic properties of entity, builds places, builds transitions, and builds place regions and transition regions. In defining a place, the user of the present invention assigns attributes—for example, a location in x, y, and z coordinates. The attributes are then defined. In defining a transition, a user assigns connections by use of arcs (connection to places). Connection specifics are defined with variables and ports, and local variables. The input/output places connects local variable of transition to an input or output place attribute, and also define functions. The user also assigns names, colors, size, and other basics.

As discussed above, building system designs involves building design entities such as places and transitions. Two other design entities may be used in the present invention—place regions and transition regions. Place and transition regions are HCPNs that contain places and transitions but behave in a manner of places and transitions. For example, instead of having a place F-15, it could be a place region called F-15 that contains a HCPN that models an F-15.

In the present invention, the method and system operates by the following steps.

First, the basic properties of an entity (place, place region, transition, and transition region) are defined. The entity is named; since entities may be reusable in the present invention, this name should be the most generic name applicable to the entity. For example, one might create a place named city. A system designer might then create a HCPN modeling traffic flow that utilizes a number of the city places. These cities might have more specific names such as Houston, Dallas, and Austin.

If the entity is a place, the next step is to define the base places of the new place. The present invention contains the framework for creating executable HCPNs. One of the requirements for executable system designs is the full specification of the entities; i.e. identifying attributes with values. Some places will share many of the same attributes. For instance a place called F-15 and a place called Tank will both contain the attributes of x, y, and z position vectors. The present invention also incorporates the concept of inheritance from the object oriented world to facilitate place development. This is achieved through the use of base places. A new place will inherit all the attributes and their initial values from base places defined for it. Thus, the place F-15 would inherit the position vector attributes if the base place Movement Model (which has these attributes defined for it) is defined for it. The place F-15A would include all the attributes of F-15 if the entity F-15 was defined as a base place for F-15A. In addition, the attributes of a new place must be defined. A place's attributes are quantitative descriptions of the tokens that reside at the place. A place inherits all the attributes of its base places.

If the entity is a transition, the connectivity of the transition (via arcs) must be defined, with the places to which the transition connects specified. The connectivity of a transition is specified with local variables and ports. Local variables in the transition connect to place attributes in the input and output places of the transition. The connection is specified through the ports of the transitions. These local variables can then be acted upon by functions within the transition to change attributes of output places.

Specifying a transition's connectivity begins with defining the local variables; once the local variables of a transition have been created, the ports that connect them to attributes of the input and output places need to be created. Input ports connect to place attributes in input places, output ports connect to attributes in output places.

Functions of the transition change the attribute values of output places for the transition and affect the state of the system. Functions do this by combining the input place attributes in a function and setting an output variable based upon it. Functions require the output port and the equation. The output port defines which place attribute the function sets. The equation of the function specifies how the function combines local variables of the transition. Thus, a function could be of the form output port=local variable1*local variable2.

All new entities (places, transitions, place and transition regions) can have an icon associated with them. Icons assist in the graphical representation of the HCPN. They allow a viewer to quickly associate an entity with a real-life icon that represents the entity. Icons have no impact on the execution of an HCPN, and are a graphical representation of portions of the present invention.

The following is an example of the present invention operating in a Windows computer environment used to model a military base's air defense system. This military base has two primary means of defending itself, a squadron of F-15s and a ground battery of anti-aircraft missiles. It has a ground based radar and an airborne AWACS plane scanning the skies for potential threats. In attempting to model this system, we first consider the places (nouns) of the system. At first glance there are four nouns relating to the base (F-15, Anti-aircraft missiles, ground based radar, and AWACS plane) and two relating to the enemy (Enemy planes and an Enemy Air Base). The first task is to create a project for and then build these places as design entities.

Since other bases are expected to design air defense systems using HCPNs, a project is created—in the computer program embodiment of the present invention, by project for air defense by accessing File >> Choose Project and pressing the "New" button.

Next, air defense places are built. Six such places may be built in this example: F-15, Anti-aircraft missile, Ground Based Radar, AWACS plane, Enemy Planes, and Enemy Air Base. These places are assigned to the air defense project created above and saved as a new system design. An example of the creation of these places using the present invention in a Windows computer environment is shown in FIG. 1.

Figure 2:
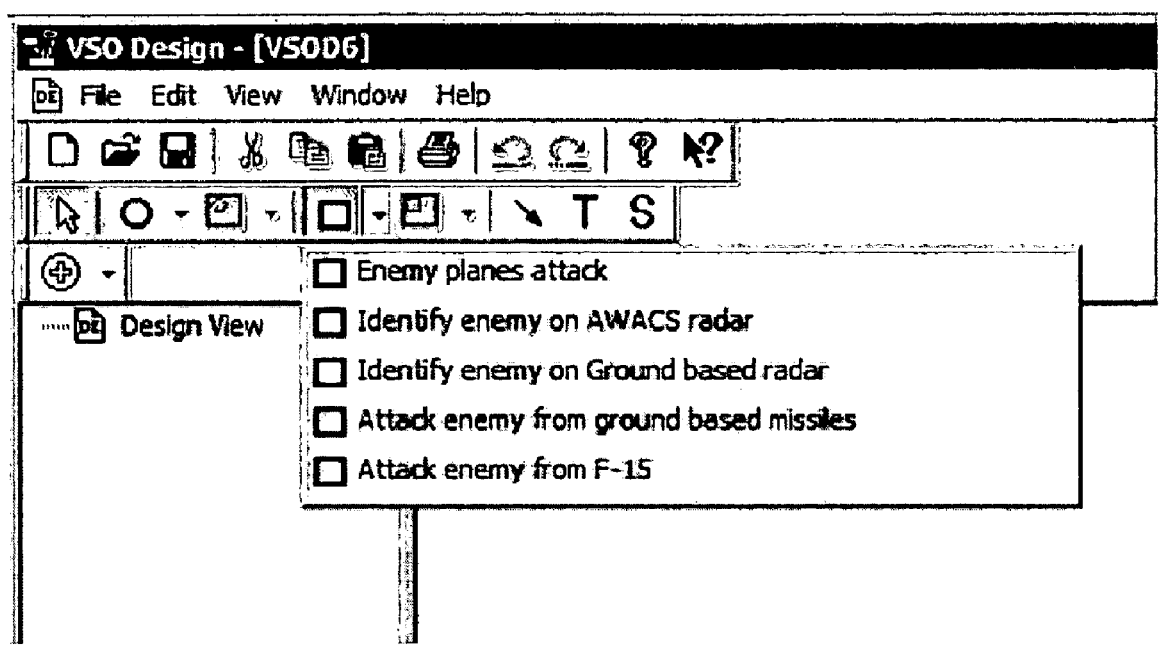
FIG. 2 shows an example of the creation of these transitions using an embodiment of the present invention in a Windows computer environment.

Next, the air defense transitions are built. The following transitions may be built in this example: Enemy Planes Attack (this will represent enemy planes taking off from the enemy air base and attacking the friendly air base), Identify enemy on AWACS radar, Identify enemy on Ground Based Radar, Share Target Information over Integrated Battle Network, Attack enemy from Anti-aircraft missiles, Attack enemy from F-15. After creating these transitions (associating them with the project Air Defense) they are placed in the system design. An example of the creation of these transitions using the present invention in a Windows computer environment is shown in FIG. 2.

Figure 3:
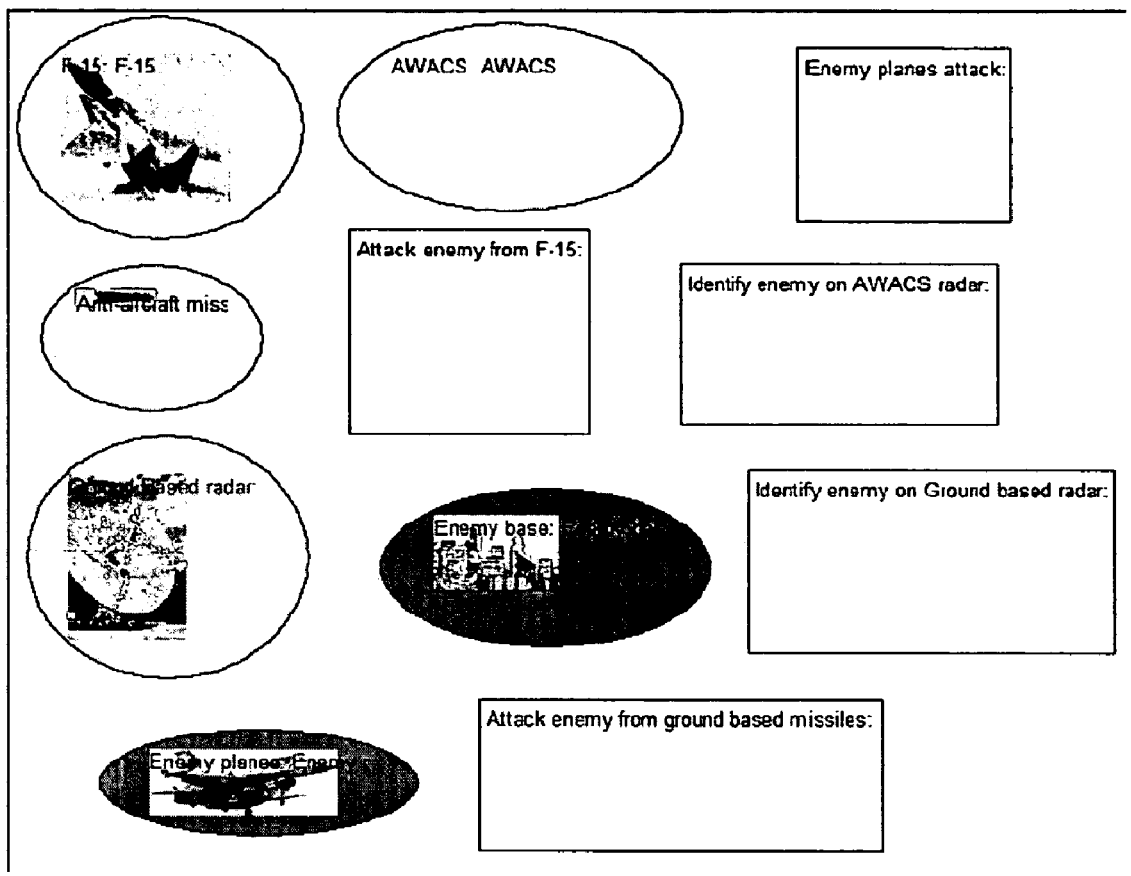
FIG. 3 shows an example of an embodiment of the present invention with places and transitions existing in a graphical environment.

When done, the model of places and transitions can exist in a graphical environment as shown in FIG. 3.

Figure 4:
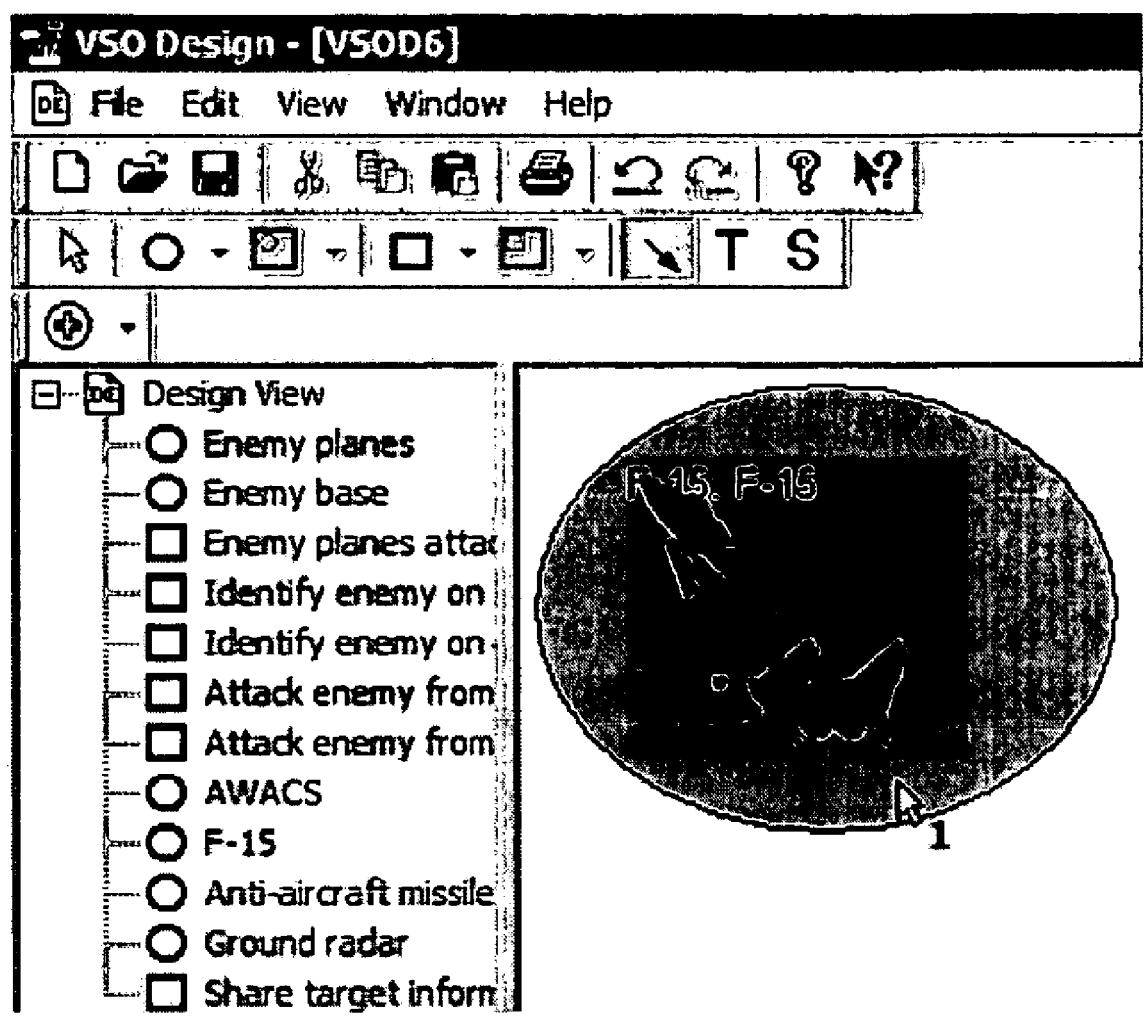
FIG. 4 shows an example of the creation of the starting point of arcs using an embodiment of the present invention in a Windows computer environment.
Figure 5:
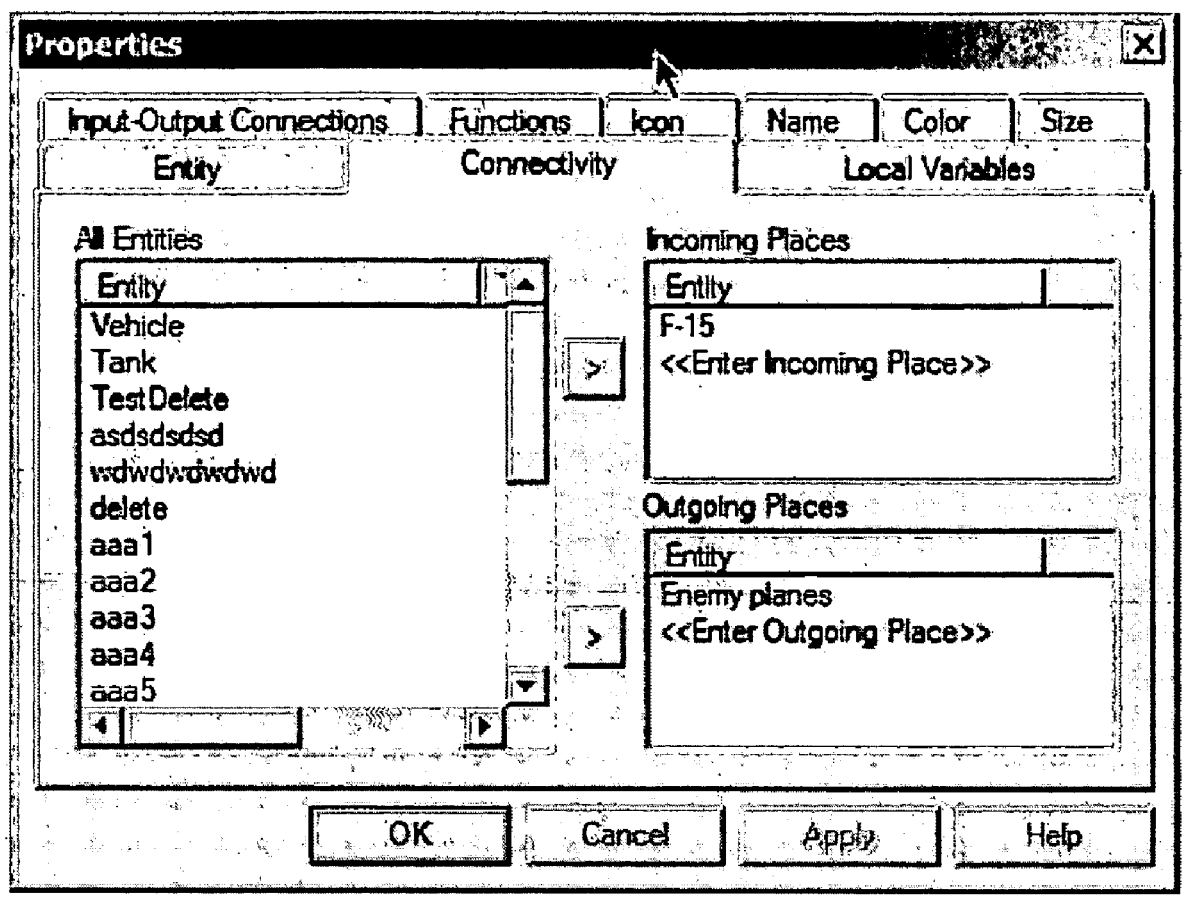
FIG. 5 shows the connectivity for places with arcs.
Figure 6:
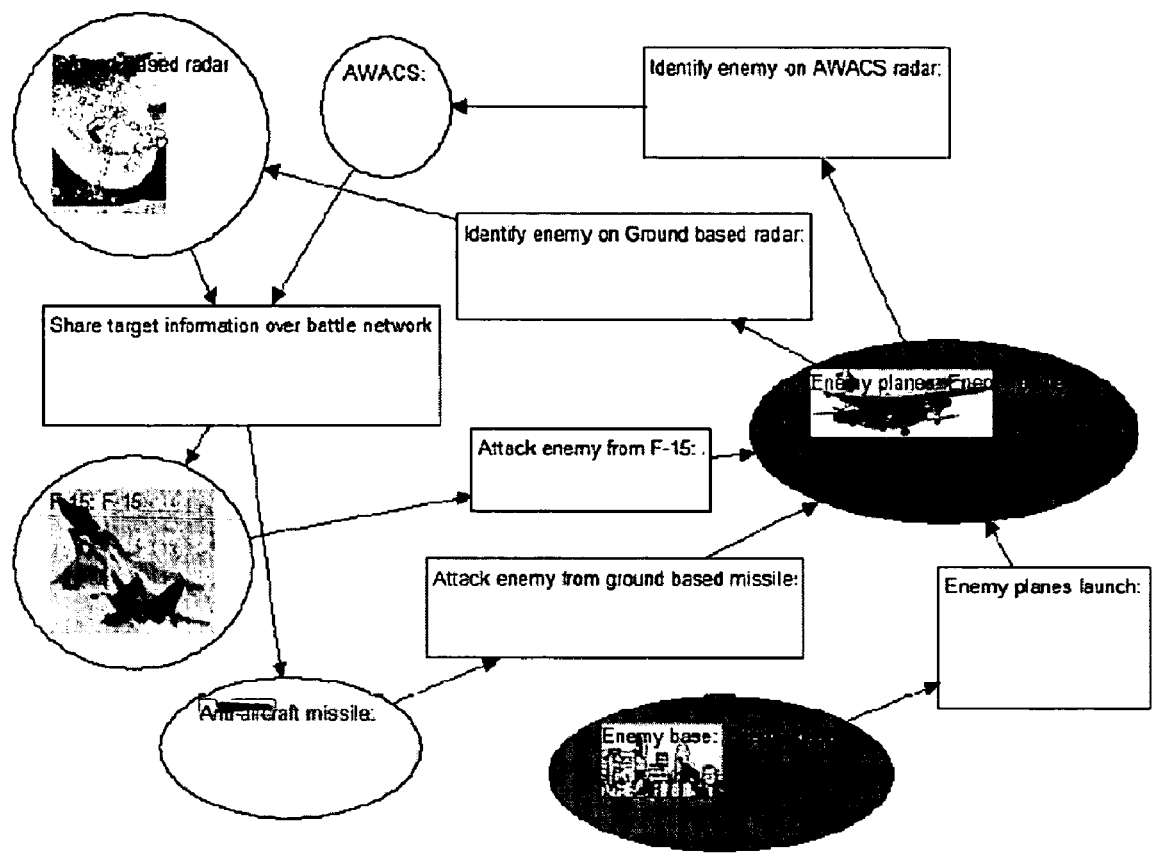
FIG. 6 shows an air defense system with places and arcs.

The next step in developing the military base air defense system design is to link the places and the transitions using arcs. For an arc, a starting link and ending link (of either transitions or places) must be specified. Transitions may not arc to transitions and places may not arc to places. Places may only be connected to transitions that have them defined as an input or output place. These definitions are established while creating or editing a transition. In the present example connectivity definition can not take place for specific instances of transitions. Therefore if transitions with inappropriate connectivity definition are instantiated in a system design, the transitions must be edited and reinserted into the system design. An example of the creation of the starting point of these arcs using the present invention in a Windows computer environment is shown in FIG. 4. The connectivity for all places with arcs is defined as shown in FIG. 5. An embodiment of an air defense system with places and arcs is shown in FIG. 6.

Figure 8:
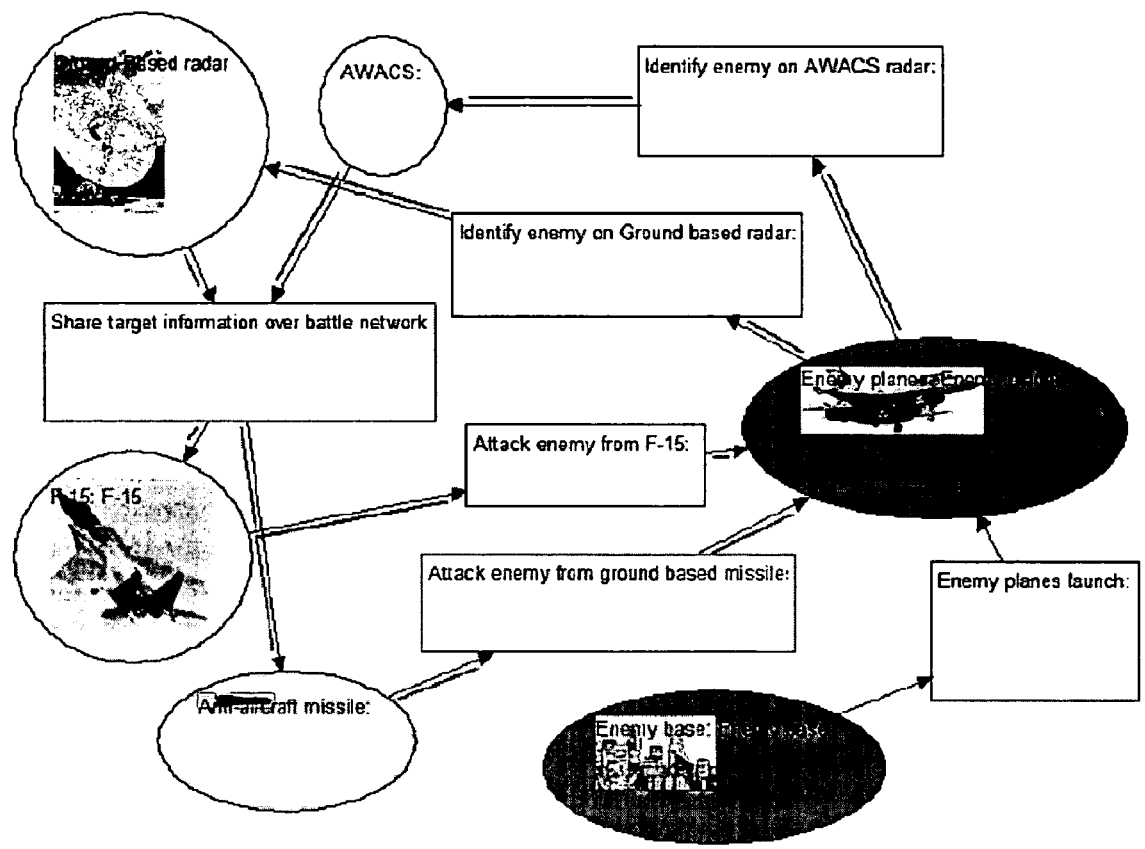
FIG. 8 shows the incorporation of threads into the air defense system.

Next, threads for the system design are established. Threads provide a way to identify and recognize separate processes in a HCPN. For example, in the air defense system design an air response thread and a ground response thread could be identified. The air response thread would include the AWACS plane, the F-15 and the associated transitions. The ground response thread would include the ground based radar, the anti-aircraft missile battery and the associated Transitions. Identifying these threads in the system design allows the identification of critical places and Transitions used by multiple threads. Once the thread has been created it must be applied to the system design. Threads are added to arcs. An example of the creation of threads using the present invention in a Windows computer environment is shown in FIG. 7. The incorporation of threads into the air defense system of the present embodiment is shown in FIG. 8.

The system can also utilize place region and transition region entities. Region definition must occur with the entities themselves, not with specific instances of regions. Once the appropriate places and transitions have been identified for combination in a region, a region should be created and the places and transitions to be contained defined within it.

Thus, a system can be modified to use a place region to replace the transition Enemy Planes Attack and the places Enemy Planes and Enemy Base. Arcs must also be defined and connected to the place region. Similarly, a design can be modified by replacing the Share target information transition with a transition region.

Figure 9:
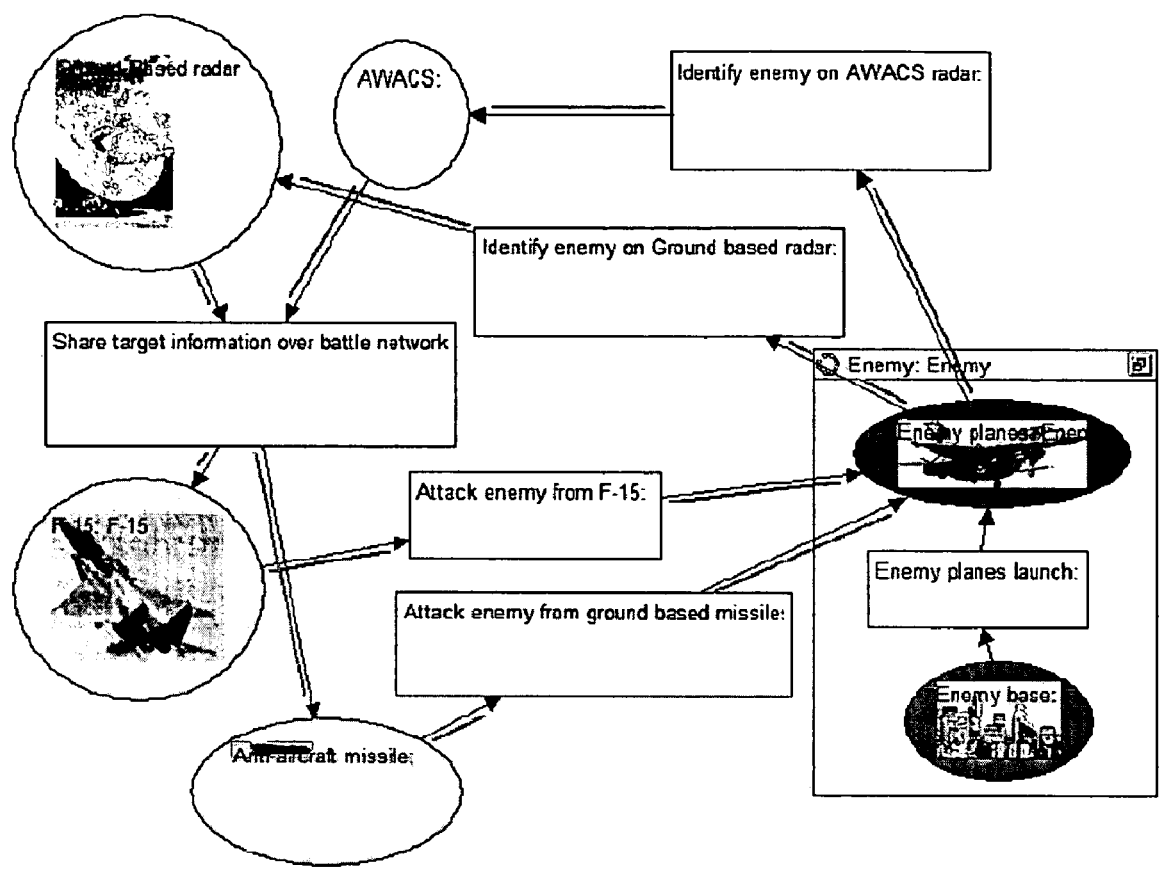
FIG. 9 shows an example of the creation of regions using an embodiment of the present invention in a Windows computer environment.
Figure 10:
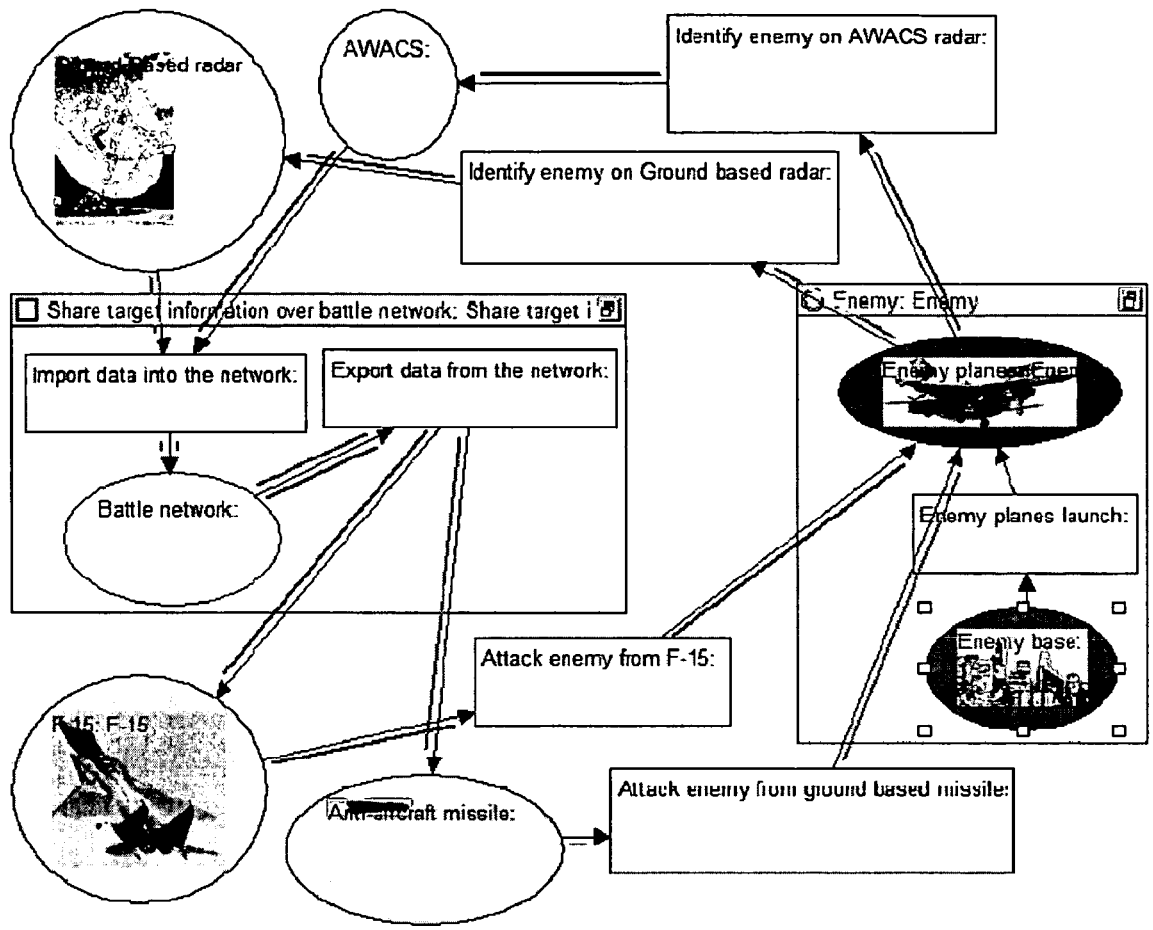
FIG. 10 shows the incorporation of regions into the air defense system.

An example of the creation of regions using the present invention in a Windows computer environment is shown in FIG. 9. The incorporation of regions into the air defense system of the present embodiment is shown in FIG. 10.

Design entities (places and transitions) and regions can be modified in two different ways: changing the entity or regions themselves or changing specific instances of the entity or region. Entities and regions are stored in the database. They exist outside of and apart from any system design. Specific instances of entities and regions exist only in the context of a specific HCPN. Specific instances of entities and regions are built from the entities and regions stored in the database. If no projects are selected for, modelers will be able to created system designs using generic places, transitions, and regions. These generic entities are not built from entities stored in the database and designs constructed from them can not be simulated.

In addition, the embodiment of the present invention running in a personal computer environment might utilize a Design Blueprint and Design Navigator to model and simulate a process. Running in a computer program, a user seeks to construct a system design of an air defense system. To begin that process, the user builds the entities and regions from which the air defense HCPN will be built. Those entities and regions are built and stored in a database. One of those instances might include a place named F-15. When the air defense system design is being constructed, several of the F-15 places may be added (e.g. Captain Baker's and Lieutenant Wright's) to the HCPN. Each F-15 in the model is a specific instance of the place F-15. Thus, while Captain Baker's and Lieutenant Wright's F-15s will have the same attributes, those attributes will likely contain different values (e.g. their x, y, and z position coordinates). Modifying the properties for specific instances of entities will only affect that specific instance of the entity. Modifying the properties of the entity in the database will change the default properties for all specific entities instantiated from that entity in the future.

For the place entity, the following components exist in an exemplary embodiment.

Places are represented by ellipses in the Design Blueprint.

The properties of a place may be accessed by editing the place. To edit a place in the computer environment, the user selects File >> Open, selects Entity from the Functions dialogue, then selects the appropriate entity to edit from the Choose Entity dialogue and presses the Continue button. The properties of the place can be edited by right clicking on the place in the Design Blueprint or Design Navigator: The properties of a specific instance of a place may be accessed by right clicking on the place in the Design Blueprint or Design Navigator in a system design containing instances of the place. The properties dialogue contains a tab for the following groups of properties: Entity, Base places, Attributes, Icon, Name, Color, and Size.

General settings for the entity are created. The Entity Type field has the value place, representing that the selected entity is a place. The Entity Name field contains the place's generic name. This field is not modifiable for specific instances of entities. The projects the entity is assigned to are listed to the right. All projects are listed. Entities can be added and removed from projects by adjusting the checkbox next to the project appropriately. The projects to which a specific entity belongs can not be modified individually. Only projects the entity belongs to are listed.

Base places provide an inheritance mechanism for model development. Places inherit the attributes of their base places. For instance if the base place vehicle contains the attributes x, y and z (position coordinates). All places that list vehicle as a base place will contain those same attributes. Additionally, transition connectivity is passed on from base place to inheriting place. For instance if the transition move allows an input and an output connection to the place vehicle, then the place tank, which inherits from the base place vehicle will also be able to form an input and output connection to the transition move. All places may serve as base places for other places.

In the present embodiment, the entities available to be base places for the place appear to the user; new base places are added by selecting them, and base places can be removed from a place.

Attributes give definition to places. A user might enumerate the characteristics of places with attributes. For example, the place tank might have the attributes fuel level, ammunition available, and the like. The name, type, initial value, minimum and maximum values for the attributes of the place can be selected, as well as attributes inherited from base places. Attributes can be added or deleted, and the name, value, minimum, and maximum value of attributes can be edited.

The icon that represents the place in a HCPN can be modified. The specific name of the entity can be modified. The specific name provides a way to differentiate between multiple instances of the same entity in a system design. In the design blueprint window, the name format for an entity is<generic name: specific name>. Modifying the specific name for an entity changes the default specific name for newly instantiated entities. The specific name, text alignment, font, formatting, color, size, and other physical properties can also be edited and modified.

For the place region entity, the following components exist in the exemplary embodiment.

Place regions are represented in the Design Window by a box (container) with an ellipse in the upper left corner.

The properties of a place region may be created and/or modified by the following groups or properties: entity, icon, name, color, and size. The Entity Type field has the value place Region, representing that the selected entity is a place region. The Entity Name field contains the place region's generic name. This field is modifiable for generic entities. The icon that represents the place in a graphical HCPN can be modified. The specific name of the entity can be modified from the Name tab. The specific name provides a way to differentiate between multiple copies of the same entity in a system design. In the design blueprint window, the name format for an entity is <generic name: specific name>. Modifying the specific name for a generic entity changes the default specific name for newly instantiated entities. Finally, the color and size of the place region may be created and/or modified.

For the transition entity, the following components exist in the exemplary embodiment.

Transitions are represented by rectangles in the Design Window.

The properties of a Transition may be accessed by a user manipulating the Design Blueprint or Design Navigator. This will cause the Properties Window to appear. The properties window contains a tab for the following groups of properties: Entity, Connectivity, Local Variables, Input-Output Connections, Functions, Icon, Name, Color, Size, and Attributes.

The Entity Type field has the value Transition, representing that the selected entity is a transition. The Entity Name field contains the transition's generic name. The projects the entity is assigned to appear on can be listed.

Transitions connect to places via arcs. The places that a transition can connect to are defined when the entity is created. The connectivity of a transition is technically specified with local variables and ports. Local variables in the transition connect to place attributes in the input and output places of the transition. The connection is specified through the ports of the transitions. These local variables can then be acted upon by functions within the transition to change attributes of output places. Specifying a transition's connectivity begins with defining the local variables. Once the local variables of a transition have been created, the ports that connect them to attributes of the input and output places need to be created. Port generation occurs by the user manipulating the program so as to set the attributes; Input ports connect to place attributes in input places, output ports connect to attributes in output places.

Functions of the transition change the attribute values of output places for the transition and affect the state of the system. They do this by combining the input place attributes in a function and setting an output variable based upon it. New functions require two pieces of information, the output port and the equation. The output port defines which place attribute the function sets. The equation of the function specifies how the function combines local variables of the transition.

The icon, name, color, size, and other physical representation characteristics can also be created and modified by the user.

For the transition region entity, the following components exist in an exemplary embodiment.

Transition Regions are represented in the Design Window by a box (container) with a rectangle in the upper left corner.

The properties of a place region may be created and/or modified by the following groups or properties: entity, icon, name, color, and size. The Entity Type field has the value Transition Region, representing that the selected entity is a transition region. The Entity Name field contains the transition region's generic name. This field is modifiable for generic entities. The icon that represents the transition in a graphical HCPN can be modified. The specific name of the entity can be modified from the Name tab. The specific name provides a way to differentiate between multiple copies of the same entity in a system design. In the design blueprint window, the name format for an entity is <generic name: specific name>. Modifying the specific name for a generic entity changes the default specific name for newly instantiated entities. Finally, the color and size of the transition region may be created and/or modified.

For the process entity, the following components exist in the exemplary embodiment.

The structure of the process entity is the arc; arcs are represented by arrows in the Design Window. An arc's properties include its color threads, and attributes, all of which may be created and modified by the user.

The above example is but one embodiment of the present invention, operating on a personal computer, to build and simulate a complex according to the present invention.

As will be understood by those skilled in the art, many changes in the apparatus and methods described above may be made by the skilled practitioner without departing from the spirit and scope of the invention.

APPENDIX A

The format is as follows:

| FILE NAME Creation Date and Time | Size (kb) |
|---|---|
| AnimationView.cpp May 22, 2003 7:36 pm | 5,354 |
| AnimationView.h Mar. 06, 2003 11:56 pm | 2,064 |
| Arc.h Sep. 09, 2003 8:07 pm | 3,605 |
| ArcTool.cpp Sep. 29, 2003 6:09 pm | 5,032 |
| ArcTool.h Dec. 05, 2002 7:37 pm | 969 |
| Attribute.cpp Oct. 21, 2003 8:42 pm | 2,409 |
| Attribute.h Sep. 10, 2003 2:28 am | 915 |
| AttributeDoc.cpp Sep. 28, 2003 9:37 pm | 12,528 |
| AttributeDoc.h Sep. 24, 2003 8:39 pm | 2,396 |
| AttributeMap.cpp Oct. 21, 2003 8:42 pm | 8,150 |
| AttributeMap.h Sep. 10, 2003 2:28 am | 1,899 |
| AttributePage.cpp Oct. 20, 2003 4:53 pm | 18,156 |
| AttributePage.h Jul. 22, 2003 1:50 am | 2,026 |
| AttrToPort.cpp Mar. 10, 2003 5:58 pm | 3,167 |
| AttrToPort.h Dec. 02, 2002 7:00 pm | 1,465 |
| BaseEntityPage.cpp Jan. 03, 2003 12:39 am | 13,714 |
| BaseEntityPage.h Dec. 24, 2002 5:49 pm | 2,200 |

| FILE NAME Creation Date and Time | Size (kb) |
|---|---|
| BaseObject.cpp Oct. 26, 2003 1:41 am | 0 |
| BaseObject.h Sep. 16, 2003 3:54 pm | 4,778 |
| BasePlacesList.cpp Jul. 21, 2003 10:11 pm | 3,590 |
| BasePlacesList.h Jul. 21, 2003 10:11 pm | 1,179 |
| Breakpoint.cpp Sep. 10, 2003 2:28 am | 2,427 |
| Breakpoint.h Sep. 10, 2003 2:28 am | 1,042 |
| BreakpointManager.cpp Sep. 10, 2003 2:28 am | 9,025 |
| BreakpointManager.h Sep. 10, 2003 2:28 am | 2,044 |
| BreakpointsList.cpp Oct. 20, 2003 4:53 pm | 19,648 |
| BreakpointsList.h Sep. 10, 2003 2:28 am | 1,537 |
| ChildFrm.cpp Jul. 22, 2003 3:07 am | 2,412 |
| ChildFrm.h May 28, 2003 4:22 pm | 1,608 |
| ColorComboBox.cpp Jan. 24, 2002 3:28 am | 4,259 |
| ColorComboBox.h Dec. 18, 2001 3:27 am | 1,291 |
| ColorPage.cpp Dec. 20, 2002 10:31 pm | 3,697 |
| ColorPage.h Nov. 19, 2002 3:13 am | 1,627 |
| ConnectionsPage.cpp Sep. 30, 2003 6:32 pm | 3,316 |
| ConnectionsPage.h Feb. 02, 2003 10:41 pm | 1,305 |
| ConnectionsRecord.cpp Jan. 03, 2003 3:51 am | 996 |
| ConnectionsRecord.h Jan. 03, 2003 3:48 am | 822 |
| ConnectionsSet.cpp Aug. 25, 2003 10:00 pm | 5,574 |
| ConnectionsSet.h Mar. 19, 2003 1:12 am | 1,637 |
| Convert.cpp Aug. 12, 2003 9:36 pm | 21,092 |
| Convert.h Apr. 26, 2002 5:15 pm | 2,295 |
| DBWrapper.cpp Aug. 12, 2003 9:36 pm | 29,481 |
| DBWrapper.h Jun. 05, 2003 12:37 am | 4,402 |
| DEdit.cpp Aug. 24, 2003 7:17 pm | 21,461 |
| DEdit.h Sep. 10, 2003 2:28 am | 2,956 |
| DEditDBDoc.cpp Sep. 30, 2003 6:36 pm | 9,092 |
| DEditDBDoc.h Sep. 30, 2003 6:36 pm | 1,726 |
| DEditDoc.cpp Oct. 21, 2003 12:28 am | 42,540 |
| DEditDoc.h Oct. 20, 2003 4:53 pm | 6,054 |
| DEditListCtrl.cpp Jul. 30, 2003 8:30 pm | 12,688 |
| DEditListCtrl.h Jul. 30, 2003 8:30 pm | 2,876 |
| DEditRes.cpp Jul. 31, 2003 9:17 pm | 12,328 |
| DEditRes.h Nov. 11, 2002 11:17 pm | 2,791 |
| DEditView.cpp Sep. 30, 2003 2:27 am | 49,252 |
| DEditView.h Sep. 10, 2003 2:29 am | 6,200 |
| DesignView.cpp Sep. 30, 2003 2:27 am | 27,242 |
| DesignView.h May 28, 2003 6:02 pm | 2,540 |
| Entity.cpp Jun. 26, 2003 5:22 pm | 1,312 |
| Entity.h Nov. 20, 2002 1:14 am | 772 |
| EntityPage.cpp Sep. 24, 2003 10:25 pm | 8,543 |
| EntityPage.h Aug. 11, 2003 6:33 pm | 1,758 |
| Equation.cpp Oct. 22, 2003 7:30 pm | 13,407 |
| Equation.h Sep. 26, 2003 11:16 pm | 1,981 |
| ExecutionThread.h Oct. 01, 2003 1:06 am | 1,984 |
| ExecutionToolBar.cpp Sep. 29, 2003 4:06 pm | 6,873 |
| ExecutionToolBar.h Sep. 17, 2003 5:49 pm | 1,742 |
| ExecutionWnd.cpp Oct. 20, 2003 4:53 pm | 1,310 |
| ExecutionWnd.h Sep. 29, 2003 11:43 pm | 1,359 |
| ExtProcessPage.cpp Sep. 26, 2003 8:53 pm | 7,060 |
| ExtProcessPage.h Sep. 26, 2003 8:39 pm | 1,715 |
| FinishPage.cpp Jun. 24, 2003 7:52 am | 1,948 |
| FinishPage.h May 01, 2003 6:59 pm | 1,406 |
| Function.cpp Oct. 21, 2003 8:42 pm | 20,396 |
| Function.h Sep. 26, 2003 11:20 pm | 3,334 |
| FunctionArray.cpp Oct. 21, 2003 8:42 pm | 2,182 |
| FunctionArray.h Oct. 21, 2003 8:42 pm | 1,012 |
| FunctionPage.cpp Oct. 21, 2003 8:42 pm | 19,254 |
| FunctionPage.h Oct. 21, 2003 8:42 pm | 2,307 |
| FunctionsMap.cpp Jul. 21, 2003 1:36 am | 2,130 |
| FunctionsMap.h Jul. 21, 2003 1:36 am | 895 |
| GlobalFunctions.cpp Sep. 30, 2003 6:22 pm | 474 |
| GlobalFunctions.h Sep. 10, 2003 2:29 am | 1,124 |
| Icon.cpp Jun. 27, 2003 6:12 pm | 1,944 |
| Icon.h Jun. 27, 2003 6:12 pm | 962 |
| IconPage.cpp Feb. 13, 2003 7:32 pm | 3,975 |
| IconPage.h Nov. 19, 2002 3:11 am | 1,524 |
| IconsArray.cpp Mar. 24, 2003 8:10 pm | 4,714 |
| IconsArray.h Nov. 11, 2002 9:12 pm | 1,195 |
| IconsMenu.cpp Jul. 31, 2002 10:25 pm | 5,140 |
| IconsMenu.h May 22, 2002 7:21 pm | 1,029 |
| InObjCombo.cpp Jul. 30, 2003 8:29 pm | 1,474 |
| InObjCombo.h May 06, 2003 11:01 pm | 1,273 |
| InObjREdit.cpp Jul. 30, 2003 8:37 pm | 6,173 |

-continued

| FILE NAME Creation Date and Time | Size (kb) |
|---|---|
| InObjREdit.h Jul. 27, 2003 8:52 pm | 1,575 |
| LeftView.cpp Jul. 22, 2003 1:50 am | 24,901 |
| LeftView.h Jul. 22, 2003 1:50 am | 4,065 |
| MainFrm.cpp Sep. 28, 2003 11:25 pm | 21,697 |
| MainFrm.h Sep. 28, 2003 10:55 pm | 3,180 |
| NewOpen.cpp Jun. 23, 2003 12:38 am | 1,660 |
| NewOpen.h Nov. 20, 2002 6:12 pm | 1,292 |
| ParentList.cpp Jul. 22, 2003 1:50 am | 2,564 |
| ParentList.h Jul. 22, 2003 1:50 am | 913 |
| Place.h Sep. 16, 2003 3:54 pm | 1,889 |
| PlaceReg.cpp Jul. 08, 2003 9:21 pm | 4,839 |
| PlaceReg.h Jun. 27, 2003 12:56 am | 1,162 |
| PlaceRegTool.cpp Jul. 12, 2002 8:12 pm | 987 |
| PlaceRegTool.h Jul. 04, 2002 8:56 pm | 740 |
| PlaceTool.cpp May 08, 2002 11:26 pm | 789 |
| PlaceTool.h Jun. 13, 2001 7:28 pm | 658 |
| portal.cpp Aug. 25, 2003 9:29 pm | 1,057 |
| PortDefPage.cpp Oct. 20, 2003 4:53 pm | 21,554 |
| PortDefPage.h Jun. 24, 2003 7:50 pm | 2,041 |
| ProjectEntityDlg.cpp Jul. 27, 2003 8:52 pm | 33,009 |
| ProjectEntityDlg.h Jul. 07, 2003 6:25 pm | 4,095 |
| Properties.cpp Jun. 25, 2003 7:46 pm | 2,630 |
| Properties.h Aug. 11, 2003 9:42 pm | 3,239 |
| Region.h Sep. 16, 2003 3:54 pm | 3,584 |
| resource.h Oct. 08, 2003 4:41 am | 12,838 |
| Select.cpp May 17, 2002 1:28 am | 666 |
| Select.h May 17, 2002 1:29 am | 614 |
| SelectTool.cpp Sep. 26, 2003 9:22 pm | 13,032 |
| SelectTool.h Jul. 25, 2003 11:55 pm | 1,340 |
| ShowEntitiesDlg.cpp Sep. 26, 2003 10:59 pm | 23,614 |
| ShowEntitiesDlg.h Sep. 26, 2003 10:12 pm | 3,913 |
| SizePage.cpp Jun. 23, 2003 5:22 pm | 5,092 |
| SizePage.h Nov. 19, 2002 3:11 am | 1,669 |
| StdAfx.cpp Feb. 06, 2002 1:29 am | 201 |
| StdAfx.h Sep. 30, 2003 7:16 pm | 3,742 |
| TextPage.cpp Jun. 25, 2003 8:03 pm | 7,097 |
| TextPage.h Jun. 25, 2003 8:03 pm | 1,659 |
| Thread.cpp Jun. 25, 2003 8:14 pm | 3,442 |

-continued

| FILE NAME Creation Date and Time | Size (kb) |
|---|---|
| Thread.h Jun. 16, 2003 7:43 pm | 1,061 |
| ThreadPage.cpp Feb. 06, 2003 9:49 pm | 2,659 |
| ThreadPage.h Nov. 19, 2002 2:57 am | 1,397 |
| ThreadTool.cpp Mar. 27, 2003 5:37 am | 2,697 |
| ThreadTool.h Jul. 19, 2002 2:41 am | 934 |
| Tools.cpp Jul. 25, 2003 11:55 pm | 5,049 |
| Tools.h Jul. 25, 2003 11:55 pm | 1,533 |
| Transition.h Oct. 22, 2003 5:41 pm | 1,779 |
| TransitionExt.h Oct. 20, 2003 4:53 pm | 1,198 |
| TransitionReg.cpp Jul. 08, 2003 9:21 pm | 3,686 |
| TransitionReg.h Jun. 27, 2003 6:33 pm | 1,070 |
| TransitionRegTool.cpp May 08, 2002 11:31 pm | 1,057 |
| TransitionRegTool.h Jun. 13, 2001 7:28 pm | 785 |
| TransitionTool.cpp May 08, 2002 11:31 pm | 852 |
| TransitionTool.h Dec. 18, 2001 3:34 am | 705 |
| VariablePage.cpp Oct. 20, 2003 4:53 pm | 16,785 |
| VariablePage.h Jul. 22, 2003 1:50 am | 2,098 |
| Vertex.h Sep. 16, 2003 3:54 pm | 2,181 |
| VSODlgBar.cpp Jul. 22, 2003 2:38 am | 10,939 |
| VSODlgBar.h Jul. 22, 2003 1:50 am | 2,253 |
| VSODllsManager.cpp Sep. 21, 2003 8:33 pm | 20,669 |
| VSODllsManager.h May 07, 2003 8:02 pm | 2,788 |
| VSOToolTips.cpp Apr. 27, 2003 7:21 pm | 2,167 |
| VSOToolTips.h Apr. 27, 2003 7:21 pm | 1,369 |
| VSOXml.cpp Jul. 28, 2003 5:22 pm | 38,773 |
| VSOXml.h Jul. 28, 2003 5:28 pm | 2,163 |
| Warning.cpp Dec. 18, 2001 4:18 pm | 1,295 |
| Warning.h Oct. 06, 2001 4:34 pm | 1,232 |
| WatchView.cpp Sep. 30, 2003 2:27 am | 17,998 |
| WatchView.h Sep. 10, 2003 2:29 am | 2,648 |
| WinRegistry.cpp Apr. 22, 2003 8:29 pm | 2,145 |
| WinRegistry.h Apr. 22, 2003 8:29 pm | 848 |
| ZoomTool.cpp Jul. 30, 2002 6:14 pm | 3,003 |
| ZoomTool.h May 08, 2002 7:39 pm | 749 |
| AfxCore.rtf Jul. 04, 2002 8:11 pm | 111,556 |
| AfxPrint.rtf Jun. 21, 2002 2:48 am | 11,363 |
| AppExit.bmp Jun. 21, 2002 2:48 am | 2,262 |
| Bullet.bmp Jun. 21, 2002 2:48 am | 142 |

-continued

| FILE NAME<br>Creation Date and Time | Size (kb) |
|---|---|
| CurArw2.bmp<br>Jun. 21, 2002 2:48 am | 310 |
| CurArw4.bmp<br>Jun. 21, 2002 2:48 am | 566 |
| CurHelp.bmp<br>Jun. 21, 2002 2:48 am | 502 |
| DEdit.hpj<br>Jul. 04, 2002 8:17 pm | 2,368 |
| EditCopy.bmp<br>Jun. 21, 2002 2:48 am | 502 |
| EditCut.bmp<br>Jun. 21, 2002 2:48 am | 502 |
| EditPast.bmp<br>Jun. 21, 2002 2:48 am | 502 |
| EditUndo.bmp<br>Jun. 21, 2002 2:48 am | 502 |
| FileNew.bmp<br>Jun. 21, 2002 2:48 am | 566 |
| FileOpen.bmp<br>Jun. 21, 2002 2:48 am | 566 |
| FilePrnt.bmp<br>Jun. 21, 2002 2:48 am | 502 |
| FileSave.bmp<br>Jun. 21, 2002 2:48 am | 502 |
| HlpSBar.bmp<br>Jun. 21, 2002 2:48 am | 7,158 |
| HlpTBar.bmp<br>Jun. 21, 2002 2:48 am | 2,354 |
| RecFirst.bmp<br>Jun. 21, 2002 2:48 am | 502 |
| RecLast.bmp<br>Jun. 21, 2002 2:48 am | 502 |
| RecNext.bmp<br>Jun. 21, 2002 2:48 am | 502 |
| RecPrev.bmp<br>Jun. 21, 2002 2:48 am | 502 |
| Scmax.bmp<br>Jun. 21, 2002 2:48 am | 502 |
| ScMenu.bmp<br>Jun. 21, 2002 2:48 am | 2,134 |
| Scmin.bmp<br>Jun. 21, 2002 2:48 am | 502 |
| VSO.hm<br>Oct. 08, 2003 6:16 pm | 4,451 |
| VSOD.cnt<br>Jul. 04, 2002 8:11 pm | 1,436 |
| VSOD.GID<br>Jul. 17, 2002 6:51 pm | 10,866 |
| VSOD.HLP<br>Oct. 08, 2003 6:16 pm | 33,402 |
| VSOD.hm<br>Jun. 23, 2003 6:06 pm | 3,765 |
| VSOD.hpj<br>Jun. 05, 2003 12:38 am | 2,473 |
| VSOD.LOG<br>Oct. 08, 2003 6:16 pm | 6,965 |
| VSOD.ph<br>Jun. 21, 2002 2:53 am | 2,943 |
| vssver.scc<br>Jul. 04, 2002 8:11 pm | 528 |
| actual.bmp<br>Oct. 29, 2002 9:29 pm | 246 |
| arc.cur<br>Apr. 17, 2001 6:45 am | 326 |
| arc.ico<br>Jul. 25, 2001 9:34 pm | 1,078 |
| arc1.cur<br>Oct. 18, 2001 6:55 pm | 326 |
| arc2.cur<br>Oct. 18, 2001 6:55 pm | 326 |
| bottom.ico<br>May 29, 2001 8:37 pm | 1,078 |
| cdicon.ico<br>Dec. 02, 2001 11:39 pm | 1,078 |
| center.bmp<br>Feb. 21, 2002 5:49 pm | 246 |

-continued

| FILE NAME<br>Creation Date and Time | Size (kb) |
|---|---|
| center.cur<br>Feb. 21, 2002 5:58 pm | 326 |
| DEdit.ico<br>Dec. 10, 2001 7:51 pm | 1,078 |
| DEdit.rc2<br>Apr. 12, 2001 8:42 pm | 397 |
| DEditDoc.ico<br>Feb. 23, 2003 4:50 pm | 9,822 |
| empty.bmp<br>Aug. 13, 2001 9:22 pm | 246 |
| ExecPause.ico<br>Jul. 28, 2003 8:05 pm | 306 |
| ExecStart.ico<br>Jul. 28, 2003 8:05 pm | 306 |
| ExecStop.ico<br>Jul. 28, 2003 8:05 pm | 306 |
| Execution.bmp<br>Sep. 25, 2003 5:16 pm | 1,198 |
| gripper.ico<br>Jun. 12, 2003 5:43 pm | 766 |
| hcenter.ico<br>Jul. 18, 2001 6:07 pm | 1,078 |
| layout.bmp<br>Feb. 21, 2002 6:00 pm | 238 |
| left.ico<br>May 29, 2001 8:37 pm | 1,078 |
| minus.bmp<br>Feb. 21, 2002 5:49 pm | 246 |
| minus.cur<br>Feb. 21, 2002 5:51 pm | 326 |
| place.bmp<br>Aug. 13, 2001 5:15 pm | 1,334 |
| place.cur<br>Oct. 18, 2001 6:55 pm | 326 |
| place.ico<br>May 15, 2001 6:07 am | 1,078 |
| placeblu.ico<br>Apr. 17, 2002 8:37 am | 1,078 |
| placebluered.ico<br>Apr. 18, 2002 4:20 am | 1,078 |
| placereg.bmp<br>Aug. 13, 2001 5:22 pm | 1,334 |
| placereg.cur<br>Oct. 18, 2001 6:55 pm | 326 |
| placereg.ico<br>Jun. 25, 2001 3:16 am | 1,078 |
| placeregblue.ico<br>Apr. 17, 2002 8:37 am | 1,078 |
| placeregbluered.ico<br>Apr. 18, 2002 10:50 am | 1,078 |
| plus.bmp<br>Feb. 21, 2002 5:49 pm | 246 |
| plus.cur<br>Feb. 21, 2002 5:51 pm | 326 |
| pred.ico<br>Jul. 19, 2001 1:40 am | 1,078 |
| pregred.ico<br>Jul. 18, 2001 6:11 pm | 1,078 |
| right.ico<br>May 29, 2001 8:37 pm | 1,078 |
| Oct. 18, 2001 6:55 pm | |
| stopped.ico<br>Jan. 02, 2003 7:40 pm | 1,078 |
| thread.bmp<br>Aug. 14, 2001 4:09 am | 246 |
| thread.cur<br>Oct. 18, 2001 6:55 pm | 326 |
| thread.ico<br>Aug. 04, 2001 6:01 pm | 1,078 |
| Toolbar.bmp<br>Oct. 22, 2001 4:23 pm | 1,438 |
| tools.bmp<br>Feb. 27, 2003 10:47 pm | 958 |
| top.ico<br>May 29, 2001 8:37 pm | 1,078 |
| TranReg.ico | 1,078 |

-continued

| FILE NAME Creation Date and Time | Size (kb) |
|---|---|
| Jun. 25, 2001 3:16 am | |
| transiti.bmp | 1,334 |
| Aug. 13, 2001 5:15 pm | |
| transiti.ico | 1,078 |
| May 15, 2001 6:07 am | |
| transition.cur | 326 |
| Oct. 18, 2001 6:55 pm | |
| transitionblue.ico | 1,078 |
| Apr. 17, 2002 8:32 am | |
| transitionbluered.ico | 1,078 |
| Apr. 18, 2002 10:50 am | |
| TRANSITIONREG.cur | 326 |
| Oct. 18, 2001 6:55 pm | |
| transitionregblue.ico | 1,078 |
| Apr. 17, 2002 8:37 am | |
| transreg.bmp | 1,334 |
| Aug. 13, 2001 5:23 pm | |
| transregbluered.ico | 1,078 |
| Apr. 18, 2002 10:50 am | |
| tred.ico | 1,078 |
| Jul. 18, 2001 6:10 pm | |
| tregred.ico | 1,078 |
| Jul. 18, 2001 6:11 pm | |
| vcenter.ico | 1,078 |
| May 29, 2001 8:37 pm | |
| vssver.scc | 1,104 |
| Sep. 25, 2003 5:16 pm | |
| win.bmp | 246 |
| Feb. 21, 2002 5:58 pm | |
| win.cur | 326 |
| Feb. 21, 2002 5:58 pm | |
| zoomall.bmp | 246 |
| Mar. 08, 2002 5:43 pm | |

I claim:

1. A method for creating a complex process model of defined entities in a graphical environment comprising the steps of:
 defining a place comprising data types; and
 defining a transition comprising actions;
 wherein the connectivity of said place and said transition exists as an arc, and wherein said place, said transition, or said connectivity can be interchanged.

2. The method of claim 1, wherein said place comprises a a plurality of places to define a place region.

3. The method of claim 1, wherein said transition comprises a plurality of transitions to define a transition region.

4. The method of claim 1, wherein said arc constitutes an input arc.

5. The method of claim 1, wherein said arc constitutes an output arc.

6. A method for simulating a complex process in an graphical environment comprising the steps of:
 defining entities, wherein said entities are selected from the group of a place comprising data types and a transition comprising actions;
 defining an arc to connect said places and transitions;
 identifying the attributes of said defined entities of places and transitions;
 identifying the values of said defined entities of places and transitions;
 identifying the parameters of said arcs to connect said places and said transitions; and
 manipulating said entities on the basis of said attributes, values, and parameters; and
 wherein said places, said transitions, or said arcs can be interchanged.

7. The method of claim 6, wherein said entities include place regions constituting a plurality of places, and transition regions constituting a plurality of transitions.

8. The method of claim 6, wherein said arcs constitute input arcs.

9. The method of claim 6, wherein said arcs constitute output arcs.

10. A computer device including a processor, a memory coupled to the processor, and a program stored in the memory, wherein the computer is configured to execute the program to create a complex process model of defined entities in a graphical environment, and perform the steps of:
 defining a place comprising data types; and
 defining a transition comprising actions;
 wherein the connectivity of said place and said transition exists as an arc, and wherein said place, said transition, or said connectivity can be interchanged.

11. The computer device of claim 10, wherein said place comprises a a plurality of places to define a place region.

12. The computer device of claim 10, wherein said transition comprises a plurality of transitions to define a transition region.

13. The computer device of claim 10, wherein said arc constitutes an input arc.

14. The computer device of claim 10, wherein said arc constitutes an output arc.

15. A computer device including a processor, a memory coupled to the processor, and a program stored in the memory, wherein the computer is configured to execute the program to simulate a complex process in a graphical environment, and perform the steps of:
 defining entities, wherein said entities are selected from the group of a place comprising data types and a transition comprising actions;
 defining an arc to connect said places and transitions;
 identifying the attributes of said defined entities of places and transitions;
 identifying the values of said defined entities of places and transitions;
 identifying the parameters of said arcs to connect said places and said transitions; and
 manipulating said entities on the basis of said attributes, values, and parameters; and
 wherein said places, said transitions, or said arcs can be interchanged.

16. The computer device of claim 15, wherein said entities include place regions constituting a plurality of places, and transition regions constituting a plurality of transitions.

17. The computer device of claim 15, wherein said arcs constitute input arcs.

18. The computer device of claim 15, wherein said arcs constitute output arcs.

19. A computer readable storage medium having stored thereon a program executable by a computer processor to execute the program to create a complex process model of defined entities in a graphical environment, to perform the steps of:
 defining a place comprising data types; and
 defining a transition comprising actions;
 wherein the connectivity of said place and said transition exists as an arc, and wherein said place, said transition, or said connectivity can be interchanged.

20. The storage medium of claim 19, wherein said place comprises a a plurality of places to define a place region.

21. The storage medium of claim 19, wherein said transition comprises a plurality of transitions to define a transition region.

22. The storage medium of claim 19, wherein said arc constitutes an input arc.

23. The storage medium of claim 19, wherein said arc constitutes an output arc.

24. A computer readable storage medium having stored thereon a program executable by a computer processor to execute the program to simulate a complex process in a graphical environment, to perform the steps of:

defining entities, wherein said entities are selected from the group of a place comprising data types and a transition comprising actions;

defining an arc to connect said places and transitions;

identifying the attributes of said defined entities of places and transitions;

identifying the values of said defined entities of places and transitions;

identifying the parameters of said arcs to connect said places and said transitions; and manipulating said entities on the basis of said attributes, values, and parameters; and wherein said places, said transitions, or said arcs can be interchanged.

25. The storage medium of claim 24, wherein said entities include place regions constituting a plurality of places, and transition regions constituting a plurality of transitions.

26. The storage medium of claim 24, wherein said arcs constitute input arcs.

27. The storage medium of claim 24, wherein said arcs constitute output arcs.

* * * * *